United States Patent [19]

Sjardijn et al.

[11] Patent Number: 5,344,804
[45] Date of Patent: Sep. 6, 1994

[54] POLYMERIZATION OF CYCLOOLEFINS AND CATALYTIC SYSTEM SUITABLE FOR USE THEREIN

[75] Inventors: Willem Sjardijn; Josepha M. E. Seelen-Kruijssen, both of Amsterdam, Netherlands

[73] Assignee: Shell Research Limited, United Kingdom

[21] Appl. No.: 915,600

[22] Filed: Jul. 21, 1992

[30] Foreign Application Priority Data

Aug. 16, 1991 [GB] United Kingdom ............... 9117744.4

[51] Int. Cl.$^5$ ............................................. B01J 31/00
[52] U.S. Cl. ..................... 502/158; 502/169; 502/171
[58] Field of Search ....................... 502/158, 169, 171

[56] References Cited

U.S. PATENT DOCUMENTS

| | | |
|---|---|---|
| 4,020,254 | 4/1977 | Ofstead . |
| 4,481,344 | 11/1984 | Newburg . |
| 4,568,660 | 2/1986 | Klosiewicz ........................ 502/102 |
| 4,654,462 | 3/1987 | Basset et al. ..................... 502/102 |
| 4,729,976 | 3/1988 | Sjardijn et al. .................... 502/102 |
| 4,994,426 | 2/1991 | Sjardijn et al. .................... 502/158 |
| 5,081,208 | 1/1992 | Sjardijn et al. .................... 502/102 |

FOREIGN PATENT DOCUMENTS

| | | |
|---|---|---|
| 0084888 | 8/1983 | European Pat. Off. . |
| 0222432 | 5/1987 | European Pat. Off. . |
| 0317262 | 5/1989 | European Pat. Off. . |
| 0336486 | 10/1989 | European Pat. Off. . |
| 0374997 | 6/1990 | European Pat. Off. . |
| 1513172 | 6/1978 | United Kingdom . |
| 1519862 | 8/1978 | United Kingdom . |
| 2005280 | 4/1979 | United Kingdom . |

Primary Examiner—Anthony McFarlane
Assistant Examiner—E. D. Irzinski

[57] ABSTRACT

A catalyst system for the polymerization of cyclic olefins, comprising
(1) a tungsten compound which is obtainable by combining a tungsten halide and/or a tungsten oxyhalide with a phenol compound which is substituted with a bulky alkyl group at the positions ortho with respect to the hydroxyl group;
(2) one or more compounds of the general formula $$R^2-\underset{\underset{R^3}{|}}{\overset{\overset{R^1}{|}}{Si}}-H \quad (I)$$

wherein $R^1$, $R^2$ and $R^3$ each represent an optionally substituted alkoxy group in the range of from 2 to 8 carbon atoms and preferably from 2 to 4 carbon atoms, and wherein at most one of the symbols $R^1$, $R^2$ and $R^3$ may represent hydrogen or halogen and preferably chlorine, the compound of formula I being substantially free of organo-tin compounds;
(3) a boron halide, and a process for in mould polymerization using such catalysts.

9 Claims, No Drawings

POLYMERIZATION OF CYCLOOLEFINS AND CATALYTIC SYSTEM SUITABLE FOR USE THEREIN

The invention relates to a process for the polymerization of cycloolefins and in particular norbornene derivatives and more particularly dicyclopentadiene containing mixtures. The invention further relates to a catalytic system suitable for use in said process.

U.S. Pat. No. 4,020,254 disclosed a process for ring opening polymerization of cycloolefins by the use of a catalyst comprising:
(A) at least one transition metal salt selected from the group consisting of tungsten halides and tungsten oxyhalides,
(B) at least one compound selected from the group consisting of dialkylaluminium halides, alkylaluminium sesquihalides and alkylaluminium dihalides, and
(C) at least one alkoxysilane.

More particularly compounds were proposed of the formula RO—SiR'$_3$, wherein R is CH$_3$— or Y—CH$_2$—CH$_2$—, wherein Y is hydrogen, halogen, nitrile, alkyl containing from 1 to 4 carbon atoms or alkoxy containing from 1 to 4 carbon atoms and wherein R' is a methyl or ethyl radical and wherein the molar ratios of A/B/C was within the range of 1/0.5–10/0.5–3.

U.S. Pat. No. 4,481,344 disclosed a process using a two part metathesis catalyst system for preparation of a thermoset polymer of dicyclopencadiene units wherein a halogen containing hydrocarbyl additive had been incorporated.

The hydrocarbyl additive was included in one of a plurality of reactant streams containing dicyclopentadiene, and contains at least one trihalogen substituted carbon atom or at least one-activated halogen atom. More particularly the halogen containing hydrocarbyl additive was selected from the group consisting of chloroform, carbon tetrachloride, 1,1,1-trichloroethane, hexachloropropane, hexachloroacetone, ethyl trichloroacetate, alpha,alpha,alpha-trichlorotoluene, allyl chloride, allyl bromide, benzyl chloride and hexachlorocyclopentadiene.

The tungsten catalyst was made soluble in the monomer suspension stream by the addition of a small amount of an alcoholic or a phenolic compound.

As suitable phenolic compounds were proposed phenol, alkyl-phenols and halogen containing phenols, with tert-butyl phenol, tert-octyl phenol and nonyl phenol being most preferred.

British patent application No. 2,005,280 disclosed a method for the preparation of random copolymers of dicyclopentadiene and a compound selected from cyclopentene, cyclooctene, 1,5-cyclooctadiene and 1,5,9-cyclododecatriene by the use of a catalyst system comprising:
(A) tungsten hexachloride;
(B) an organo-silicon compound of the general formula R$_{4-n}$Si(Y)$_n$ in which the R substituents were selected from alkyl, cycloalkyl, aryl and aralkyl radicals, and Y represents either a hydroxy group or a vinyl radical and wherein n was 1 or 2;
(C) a di-n-alkylether or a phenyl-n-alkylethert; and
(D) an organo-tin compound represented by the general formula

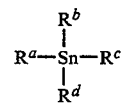

in which R$^a$, R$^b$, R$^c$ and R$^d$ were selected from n-alkyl, phenyl and vinyl radicals.

From Japanese patent application No. 50-56492 a process was known for the preparation of copolymer from norbornene derivative and cycloalkene species, by contacting a mixture of a norbornene derivative substituted with at least one polar group selected from esters, nitriles, amides, imides and halogens, and a cycloalkene species with a catalyst composed of
(a) a compound of inter alia tungsten,
(b) at least one compound of boron, silicon, germanium and tin, and
(c) at least one organo-aluminium compound containing at least one carbon aluminium bond.

It will be appreciated that the organo-aluminium compound was considered as compulsory ingredient of the catalyst system and that in comonomer mixtures rich in cycloalkene, a boron or a silicon or a tin compound had to be added to such organo-aluminium compound in order to increase polymerization yield and polymerization speed.

Moreover no intermediate compounds prepared from the initial tungsten compound and an optionally substituted phenol were mentioned at all as catalyst ingredient.

Japanese patent application No. 53103000 disclosed a process for the preparation of ring-opened polymers by ring-opening polymerization of norbornene-type derivatives containing polar or aromatic hydrocarbon groups and/or norbornadiene derivatives and cycloolefin compounds optionally in the presence of unsaturated polymers containing C═C bonds, using a catalyst system obtained from (A) organic metal compounds containing metals inter alia selected from Group IVB or IVA metals, and (B) a reaction product obtained by the reaction of (1) the reaction product formed by reaction of oxide of tungsten and/or molybdenum and Lewis acid and (2) silanol compound of formula R$_{4-n}$Si(OH)$_n$, wherein R was halogen, alkyl having less than 15 carbon atoms, aryl or alkoxy, and wherein n=1, 2 or 3.

European Patent Specification No. 0084888 disclosed a process for the manufacture of a thermoset homopolymer by combining a first reactant stream containing the activator of a metathesis-catalyst system and a second reactant stream containing the catalyst of the metathesis-catalyst system, and at least one of which streams contains dicyclopentadiene to form a reaction mixture and then, immediately injecting the reaction mixture into a mould where polymerization occurs. The catalyst could be a tungsten containing compound which can be solubilized by the addition of a small amount of a phenolic compound. Suitable phenolic compounds included phenol, alkylphenols and halogenated phenols, with tert-butylphenol, tert-octylphenol and nonylphenol being most preferred. The starting dicyclopentadiene for this known process must be essentially pure.

European Patent Application No. 0222432 disclosed a process for the bulk polymerization of dicyclopentadiene by contacting it with a catalyst system comprising (i) a tungsten compound containing a phenyl group carrying a bulky alkyl group and (ii) an organic tin compound containing one hydrogen atom bound to the tin atom.

From British patent specification No. 1,513,172 a process was known for the preparation of a segmented polymer $(A-R')_mB$ comprising the addition of a macro olefin A-R during or after the ring-opening polymerization of a cycloolefin with the aid of a ring-opening catalyst, consisting of a compound of a metal of groups 5b or 6b of the Periodic System, an organo-metallic compound of an element of groups 1a to 3a, and optionally a cocatalyst which contains an O—O, —OH or —SH group, the macro olefin being added in the presence of the catalyst.

Preferably the catalyst is a reaction product of a halide or oxyhalide of molybdenum tungsten or tantalum with a hydroxyl group containing compound, and more preferably substituted phenols whereas the organo-metallic compound is an organo-lithium compound.

As further preferred catalyst components are specified tetra(ethyl) tin and $BF_3(C_2H_5)_2O$, according to e.g. example 15. However, no use of a silane was disclosed or even suggested.

From British patent specification No. 1,519,862 a process was known for producing a ring-opening polymerization product which comprises ring-opening polymerizing at least one norbornene derivative containing at least one nitrile group, ester group, ether group, imide group, chlorine atom, bromine atom, acid anhydride group or amide group or containing a hydrocarbon residue having at most 20 carbon atoms and containing one of the above-mentioned groups, using a catalyst system prepared from an organo-metallic compound of a metal belonging to Group IA, IIA, IIB, IIIB, IVA or IVB of the long form of the Periodic Table and the reaction product of at least one of tungsten oxide and at least one of the halogen containing compounds phosphorus pentachloride, phosphorus pentafluoride, phosphorus pentabromide, phosphorus oxytrichloride, phosphorus trichloride, aluminium trichloride, aluminium tribromide, aluminium triiodide, boron trifluoride, boron trichloride, titanium tetrachloride, tin tetrachloride, and silicon tetrachloride.

It will be appreciated that no reaction products of tungsten salts and substituted phenolic compounds were specified at all as possible catalyst ingredient.

From European patent application No. 0317262 there was known a process for preparation of a transparent resin material consisting of a (co)polymer obtained by subjecting at least a polar substituent containing tetracyclododecene derivative or a combination of said compound and other copolymerizable monomer to metathesis polymerization, or a hydrogenation product of said (co)polymer, to ring-opening polymerization using a catalyst consisting of a combination of (a) at least one member selected from the group consisting of compounds W, Mo and Re, and (b) at least one member selected from the group consisting of compounds of elements of the Ia, IIa, IIb, IIIa, IVa and IVb groups of the Deming Periodic Table, having at least one element-to-carbon bond or at least one element-to-hydrogen bond.

As specific suitable examples of component (a) were inter alia mentioned $WCl_6$ and $WOCl_4$ and as specific suitable examples of component (b) were mentioned a large group of aluminium alkyl, borium alkyl and $(CH_3)_4Sn$, $(n-C_4H_9)_4Sn$, $(C_2H_5)_3SiH$, whereas a particularly preferred compounds a group of aluminium alkyl derivatives or halogen alkyl derivatives were mentioned.

As additional component (c), to be used as activating agent, were mentioned as preferred groups boron, non-organo-metal compounds such as $BF_3$; $BCl_3$; $B(O-n-C_4H_9)_3$; $(C_2H_5O_3)$-$BF$;$B_2O_3$; $H_3BO_3$ and the like, and non-organo-metal compounds of silicon such as $Si(OC_2H_5)_4$ and the like.

The molecular weight of the ring-opening (co)polymer obtained can be controlled by changing reaction conditions, e.g. type and concentration of solvent and concentration of monomer, type and concentration of catalyst and the addition to the reaction system an appropriate amount of a compound having at least one carbon-to-carbon double bond or at least one carbon-to-carbon triple bond within the molecule such as α-olefin, α-ω-diolefin, acetylene or the like, or an appropriate amount of polar allyl compound such as allyl chloride, allyl acetate, trimethylallyloxysilane or the like.

The use of a solvent in the polymerization reaction was indicated to be preferred and as suitable solvents were specified alkanes, cycloalkanes, aromatic compounds, halogenated alkanes and halogenated aryl compounds, saturated carboxylic acid esters and ethers. More preferably a solvent is used which can be used as well in the polymerization step as in the subsequent hydrogenation step of the (co)polymer obtained, i.e. a solvent selected from saturated carboxylic acid esters, saturated alicyclic hydrocarbon compounds and ether compounds.

It will be appreciated that not any reaction product of a tungsten compound and a substituted phenolic compound was disclosed or even suggested in said patent application as catalyst component (a).

From the European patent application No. 0336486 a process was known for the polymerization of norbornene derivatives, which comprises contacting the monomer(s) with a catalytic system, obtainable by combining:

(1) a tungsten compound obtainable by combining a tungsten halide with a phenol compound which is not substituted with a bulky alkyl group at the positions ortho with respect to the hydroxyl group, and (2) one or more compounds of the general formula

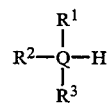

wherein Q represented Sn or Si, in which $R^1$, $R^2$ and $R^3$ each represented an optionally substituted cycloalkyl group having in the range of from 3 to 6 carbon atoms in the cycloalkyl ring or an optionally substituted phenyl group and wherein $R^1$ and $R^2$ each could also represent hydrogen.

In particular neither reference is made to alkoxy silanes as catalyst components nor reference is made to boron compounds as additional cocatalyst component.

From European patent application No. 0374997 a catalyst composition to be used for RIM polymerization of cyclic olefins, such as DCPD, was known, comprising (a) a transition metal compound, which was the reaction product of a transition metal salt and an alcohol or phenol;

(b) from 1 to 15 moles per mole of the transition metal compound of a compound selected from the group consisting of organo-aluminium compounds and organo-tin hydride compounds, and (c) a boron halide present in an amount of from 0.001 to 10 moles per mole of transition metal compound.

As preferred component (c) boron trifluoride etherate was mentioned.

It will be appreciated that not any reference was made to the use of organo-silicon compounds as cocatalyst.

At present the metathesis RIM polymerization of cycloalkadiene, e.g. dicyclopentadiene is catalyzed by bis(2,6-diisopropylphenoxy)tungstenoxydichloride whereas activation is obtained by the addition of a tin compound, such as tributyltinhydride.

However, the tin compound is the most expensive part of the catalyst system and is moreover highly toxic. Therefore there is a strong need to replace said tin compounds by other activators, but to maintain the present catalyst activity or even to improve it with reference to the RIM technology to be applied, which means that the catalytic system enables a high polymerization rate and that the polymerization starts at a temperature in the range of from 25° to 90° C., so that the components of the catalytic system can be mixed at ambient temperature and after slight heating of the mixture the exothermic polymerization is initiated.

Moreover, a catalyst component, derived from a tungsten compound and a phenol, substituted with bulky alkyl groups at the positions ortho with respect to the hydroxy group, has been found to be generally preferred due to the stability and in particular less sensitivity to air of said substituted phenol, but a known disadvantage of such catalyst components was the unattractive activity when used as such.

An object of the present invention was, therefore, to provide a catalyst system, which comprises less toxic and less expensive ingredients, without deterioration of the catalyst activities in order to enable RIM polymerization on a large industrial scale.

As a result of extensive research and experimentation a catalyst system could be developed which fulfils the before-mentioned needs.

Accordingly, the present invention is relating to a catalyst system for the polymerization of cyclic olefins and in particular of norbornene derivatives, comprising (1) a tungsten compound which is obtainable by combining a tungsten halide and/or a tungsten oxyhalide with a phenol compound which is substituted with a bulky alkyl group at the positions ortho with respect to the hydroxyl group;

(2) one or more compounds of the general formula

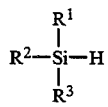
(I)

wherein $R^1$, $R^2$ and $R^3$ each represent an optionally substituted alkoxy group in the range of from 2 to 8 carbon atoms and preferably from 2 to 4 carbon atoms, and wherein at most one of the symbols $R_1$, $R_2$, $R_3$ may represent hydrogen or halogen, and preferably chlorine, the compound of formula I being substantially free of organo-tin compounds;

(3) a boron halide.

It will be appreciated that with the term "bulky alkyl group" substituting groups are meant, which are generally regarded as sterically demanding such as t-butyl, isopropyl, isobutyl, neopentyl, 3-phenyl-neopentyl and the like.

Specific suitable compounds to be used as component (2) are triethoxysilane, tri-n-propoxysilane, tri-isopropoxysilane, tri-isobutyloxysilane, tri-tert-butyloxysilane, tri-benzyloxysilane, tri-chloroethoxysilane, tri-bromoethoxysilane, diethoxysilane, diisopropoxysilane, di-isobutoxysilane, di-tert-butoxysilane.

According to a more preferred embodiment of the catalyst according to the present invention the component (1) is derived from $WCl_6$ or $WOCl_4$ and 2,6-diisopropylphenol, 2,6-diisobutylphenol, and 2,6-di-tert-butylphenol, 2,6-diisobutyl-4-methylphenol and 2,6-di-tert-butyl-4-methylphenol. The most preferred compound according to formula I is triethoxysilane. $WOCl_4$ is the most preferred tungsten compound to be included.

According to a further preferred embodiment the boron halide is selected from the group consisting of boron tribromide, boron trifluoride etherate, boron trifluoride ethylamine and boron trifluoride butyrate.

According to a further preferred embodiment the molar ratio between organo-silicon compound (2) and tungsten compound is in the range of from 4 to 10 and preferably from 6 to 8, whereas the molar ratio the boron halide and the tungsten compound is in the range of from 2 to 8 and preferably from 3 to 6.

It will be appreciated that another aspect of the present invention is formed by a process for in-mould polymerization of a cyclic olefin, comprising reacting a cyclic olefin with a catalytic system, obtainable by combining (1) a tungsten compound which is obtainable by combining a tungsten halide with a phenol compound which is substituted with a bulky alkyl group at the positions ortho with respect to the hydroxyl group;

(2) one or more compounds of the general formula

wherein $R^1$, $R^2$ and $R^3$ each represent an optionally substituted alkoxy group in the range of from 2 to 8 carbon atoms and preferably from 2 to 4 carbon atoms, and wherein at most one of the symbols $R_1$, $R_2$ and $R_3$ may represent hydrogen or halogen, the compound of formula I being substantially free of organotin compounds;

(3) a boron halide.

Component 1 may be prepared in the presence of a suitable solvent. Examples of such solvents are cyclopentane, cyclohexane, benzene and toluene, o-, m- and p-xylenes, chlorobenzene and 1,2-dichlorobenzene.

The process according to the present invention can be carried out at a molar ratio between the tungsten compound and the cyclic olefin and in particular the cycloalkadiene monomer, a molar ratio silicon compound of the general formula I to tungsten and a molar ratio of the boron compound to tungsten, which may vary within wide ranges. Preferably, the first ratio is in the range of from 1:20,000 to 1:100 and in particular 1:1,000 to 1:10,000 and the second ratio in the range of from 4:1 to 10:1 and in particular 6:1 to 8:1 and the third ratio in the range of from 3–8 and preferably of from 3 to 6.

It will be appreciated that the norbornene derivatives e.g. dicyclopentadiene or dicyclopentadiene-containing mixtures with other comonomers can be used for the process of the present invention.

Commercially, dicyclopentadiene is usually available in the endo form, but, if desired, the exo form may be used, or mixtures of the endo and exo form.

Generally, the polymerization takes place in bulk, but components 1, 2 and 3 may be dissolved in a small amount of solvent, such as toluene. It is preferred to use, however, dicyclopentadiene, optionally blended with co-monomers, as a solvent for at least one of the three components. For the silicon compounds as specified hereinbefore, no solvent at all may also suffice, since these compounds are usually a liquid at ambient temperature.

A preferred method for the polymerization of a dicyclopentadiene-containing mixture is to allow to contact a stream of component 1 with a stream of component 2 and a stream of component 3 with each other or with a stream of components 2 and 3 or to allow to contact a stream of components 1 and 3 with a stream of component 2, whereby at least one of the streams has been admixed with the dicyclopentadiene-containing mixture, prior to the polymerization, and to polymerize the dicyclopentadiene-containing mixture. For example, it is possible to dissolve component 1 in dicyclopentadiene and either to dissolve components 2 and 3 in dicyclopentadiene or in another solvent or to use the component 2 (activator) without any solvent. After the respective streams have contacted with each other, the resulting mixture is preferably injected or poured into a mould where polymerization of the dicyclopentadiene-containing mixture takes place.

Components 1, 2 and 3 may be stored in a dicyclopentadiene-containing mixture for some time, provided that the dicyclopentadiene-containing mixture contains not more than a few parts per million (ppm) by weight of water. Component 2 is storable in the dicyclopentadiene-containing mixture for one to two months without losing its activity.

With the term "dicyclopentadiene-containing mixture" are meant mixtures which are containing pure endo- or exo-dicyclopentadiene in addition to isomers and structurally related monomers.

The process according to the present invention may be carried out in the presence of auxiliary materials, for example fillers, fibers, anti-oxidants, tougheners, stabilizers, pigments and plasticizers.

The catalytic system used in the process is specifically of interest for reaction injection moulding or casting. Because of the low viscosity of the dicyclopentadiene-containing mixture/catalyst system mixture, the polymerization is very suitable for large castings with intricate moulds.

The process is carried out at an average polymerization temperature in the range of from 40° C. to 110° C., and preferably in the range of from 60° to 80° C.

It is an attractive feature of the present process that the components 1, 2 and 3 and more particularly the component 2 of the catalytic system are very stable and that total reaction can be performed within the range of from 2 to 5 minutes.

The product obtained by the process according to the invention may be subjected to a heat-treatment at a temperature in the range of from 200° C. to 300° C. for about one hour or longer. By this heat-treatment the glass transition temperature of the polymer is increased from a starting value of about 125° C. to about 160° C., which renders the polymer more useful.

The process according to the present invention allows quantitative polymerization, e.g. the polydicyclopentadiene being free from dicyclopentadiene monomer. For this reason e.g. the polydicyclopentadiene is free from odour and can be used for a large number of applications, for example for (a) structural composites, for example in the automotive industry or building industry, and (b) application in the electrical industry, for example in printed circuit boards.

The following Examples further illustrate the invention, however, without restricting its scope to these embodiments.

The starting dicyclopentadiene (DCPD) was a technical grade of high purity (ex Maruzen) containing about 99% endo DCPD. The DCPD was supplied in a tank under a dry nitrogen atmosphere.

For each of the Examples and the Comparative Experiments the preparation of the catalytic systems is described hereinafter.

Preparation of component 1

A. 2 moles of WOCl$_4$ were suspended in 40 liter dried cyclohexane in a 100 liter reactor under a dry nitrogen atmosphere. 4 moles of dried 2,6-diisopropylphenol was added in 0.5 hour. The mixture was allowed to react for 4 hours. The evolved HCl was collected in an excess of an aqueous sodium hydroxide solution. The reaction mixture was kept for 4 hours at 95° C. The catalyst component (DIPOC) was isolated by evaporation of the solvent;

B. WOCl$_4$ (1.73 mmol) was suspended in dried cyclopentane (10 ml) under a dry nitrogen blanket. 2,6-Diisopropylphenol (3.5 mmol) in cyclopentane (10 ml) was added at ambient temperature. After completion of the reaction the catalyst (DIPOC) (diisopropylphenoxyoxy compound) was isolated by evaporation of the solvent.

Polymerization of DCPD according to the present invention

A 30 ml serum-capped bottle was charged with 23.7 mg DIPOC and 10 ml DCPD of a high purity (ex Maruzen) under a dry nitrogen blanket. The catalyst was dissolved at 36°–38° C. and subsequently 23 μl BF$_3$-etherate and 57 μl triethoxysilane were added.

The reaction mixture was placed in an oil bath of 60° C. resulting in an exothermic polymerization. 4 Minutes after the start of the heating a maximum temperature of 190° C. was recorded.

Description of the polymerization experiments showing the critical character of the selected catalyst In each experiment a 30 ml serum-capped bottle was charged with DCPD (10 ml) and catalyst prepared as described hereinafter, using a molar ratio of DCPD to tungsten of 2000. Optionally BF$_3$-etherate or other coactivators as specified in Table 2 were added in the indicated amounts. Then, the organo-silicon compound (component 2) was added in such an amount that the molar ratio silicon to tungsten had a predetermined value (table 1) and a fixed value of 8.

For each experiment the time was measured which was required to obtain the maximum temperature in the bottle, this time being a measure for the activity of the catalytic system used in that experiment.

The results are presented in Tables 1 and 2 hereinafter.

TABLE 1

Influence of BF$_3$-etherate in tungsten-subst. phenol/silanes systems

| exp. No. | cocatalyst | BF3/W | bathtemp. °C. | reac. time min | T.max °C |
|---|---|---|---|---|---|
| 1 | phenylsilane | 0 | 110 | 21 | 110 |
| 2 | phenylsilane | 1 | 125 | — | — |
| 3 | phenylsilane | 6 | 90/110 | 112 | 210 |
| 4 | methylphenylsilane | 0 | 90/110 | 127 | 204 |
| 5 | methylphenylsilane | 1 | 110 | 6 | 210 |
| 6 | hexamethyldisiloxane | 0 | 110/125 | — | — |
| 7 | hexamethyldisiloxane | 1 | 125 | — | — |
| 8 | trimethyldisilane | 0 | 110/125 | 38 | 200 |
| 9 | trimethyldisilane | 1 | 125 | 3 | 200 |
| 10 | trimethyldisilane | 1 | 110 | 6 | 205 |
| 11 | n-octylsilane | 0 | 90/110 | 34 | 205 |
| 12 | n-octylsilane | 1 | 110 | 9 | 201 |
| 13 | diphenylsilane | 0 | 110 | 24 | 181 |
| 14 | diphenylsilane | 1 | 110 | 11 | 210 |
| 15 | triethoxysilane | 0 | 110 | 19 | 198 |
| 16 | triethoxysilane | 1 | 110 | 8 | 226 |

Catalyst: bis(2,6-diisopropylphenoxy)tungstenoxydichloride
DCPD: ex Maruzen
Si/W: 8

TABLE 2

Influence of other coactivators on the triethoxysilane/tungsten subst. phenol system

| exp. No. | Co-activator | Coact/W | oilbath temp. °C. | react. time min | T.max °C. | Remarks |
|---|---|---|---|---|---|---|
| 16 | BF$_3$-etherate | 1 | 110 | 8 | 226 | excellent polym. |
| 17 | — | — | 110 | 19 | 198 | excellent polym. |
| 18 | TiCl$_4$ | 1 | 125 | >30 | — | no cure |
| 19 | TiCl$_4$ | 10 | 125 | >30 | — | no cure |
| 20 | TiCl$_4$ | 5 | 110 | >30 | — | no cure |
| 21 | SnCl$_4$ | 3 | 110 | >30 | — | no cure |
| 22 | CCl$_4$ | 1 | 110 | >30 | — | no cure |
| 23 | CCl$_4$ | 3 | 110 | >30 | — | no cure |
| 24 | CCl$_4$ | 5 | 110 | >30 | — | no cure |
| 25 | CCl$_4$ | 5 | 125 | 10.5 | 225 | partially gelled |
| 26 | phenylacetylene | 1 | 125 | 21.5 | 210 | excellent polym. |
| 27 | phenylacetylene | 3 | 125 | 20.3 | 218 | excellent polym. |
| 28 | phenylacetylene | 5 | 125 | 17.5 | 170 | excellent polym. |
| 29 | CCl$_3$COOC$_2$H$_5$ | 3 | 125 | 21 | 171 | partially gelled |
| 30 | CCl$_3$COOC$_2$H$_5$ | 5 | 125 | >30 | — | no cure |

Catalyst: bis(2,6-diisopropylphenoxy)tungstenoxydichloride
DCPD: ex Maruzen
cocatalyst: triethoxysilane Si/W = 8

We claim:

1. A catalyst system for the polymerization of cyclic olefins, comprising:
   (1) a tungsten compound obtained by combining a tungsten halide and/or a tungsten oxyhalide with a phenol compound substituted with an alkyl group at the positions ortho with respect to the hydroxyl group;
   (2) one or more silane compounds having the formula

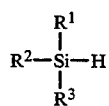

(I)

wherein R$^1$, R$^2$ and R$^3$ represent hydrogen, halogen or an alkoxy group having from 2 to 8 carbon atoms, and wherein at most one of R$^1$, R$^2$ and R$^3$ represent hydrogen or halogen, the compound of formula I being substantially free of organo-tin compounds; and
   (3) a boron halide, selected from the group consisting of boron tribromide, boron trifluoride etherate, boron trifluoride ethylamine and boron trifluoride butyrate.

2. A catalyst system according to claim 1, wherein the component (2) is triethoxysilane.

3. A catalyst system according to claim 1, wherein in component (1) said tungsten compound is selected from the group consisting of WCl$_6$ and WOCl$_4$.

4. A catalyst system according to claim 3, wherein the tungsten compound is WOCl$_4$.

5. A catalyst system according to claim 1, wherein in component (1) said substituted phenol compound is selected from the group consisting of 2,6-diisopropylphenol, 2,6-diisobutylphenol, and 2,6-di-tert-butylphenol, 2,6-diisobutyl-4-methylphenol and 2,6-di-tert-butyl-4-methylphenol.

6. A catalyst system according to claim 1, wherein the molar ratio of said component (2) to said component (1) is from 4:1 to 10:1.

7. A catalyst system according to claim 6, wherein said molar ratio is from 6:1 to 8:1.

8. A catalyst system according to claim 1, wherein the molar ratio of said component (3) to said component (1) is from 2:1 to 8:1.

9. A catalyst system according to claim 8, wherein said molar ratio is from 3:1 to 6:1.

* * * * *